Oct. 10, 1961 R. DIENER ET AL 3,004,135
MACHINES FOR THE MANUFACTURE OF TUBES
Filed March 18, 1959 4 Sheets-Sheet 3
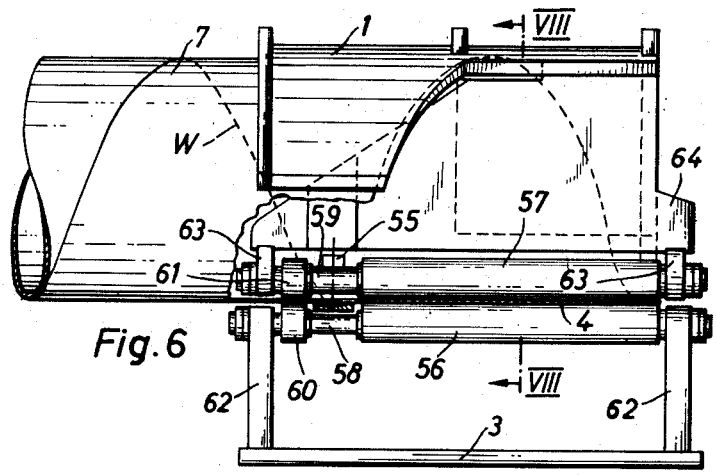
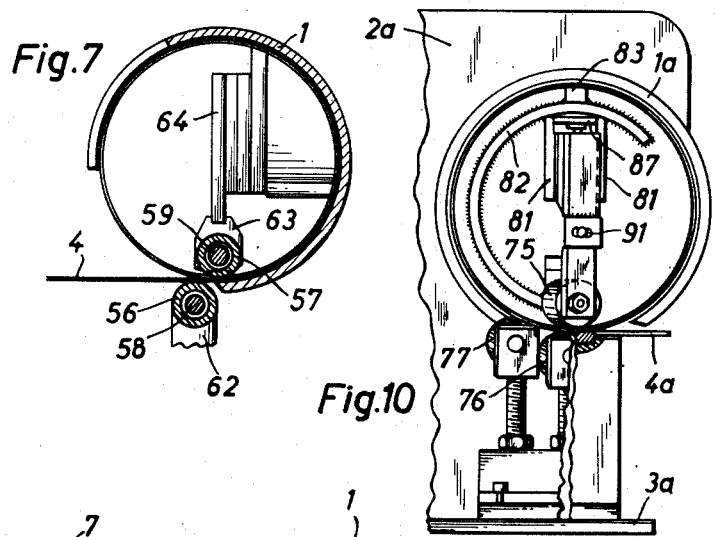
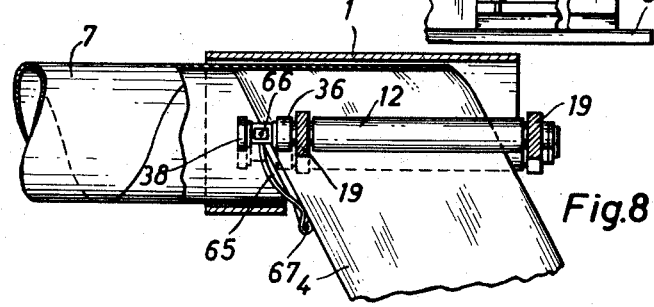
INVENTOR:
RICHARD DIENER, WERNER WENNEMAN
BY
Mestern & Hollin
ATTORNEYS Oct. 10, 1961 R. DIENER ET AL 3,004,135
MACHINES FOR THE MANUFACTURE OF TUBES
Filed March 18, 1959 4 Sheets-Sheet 4
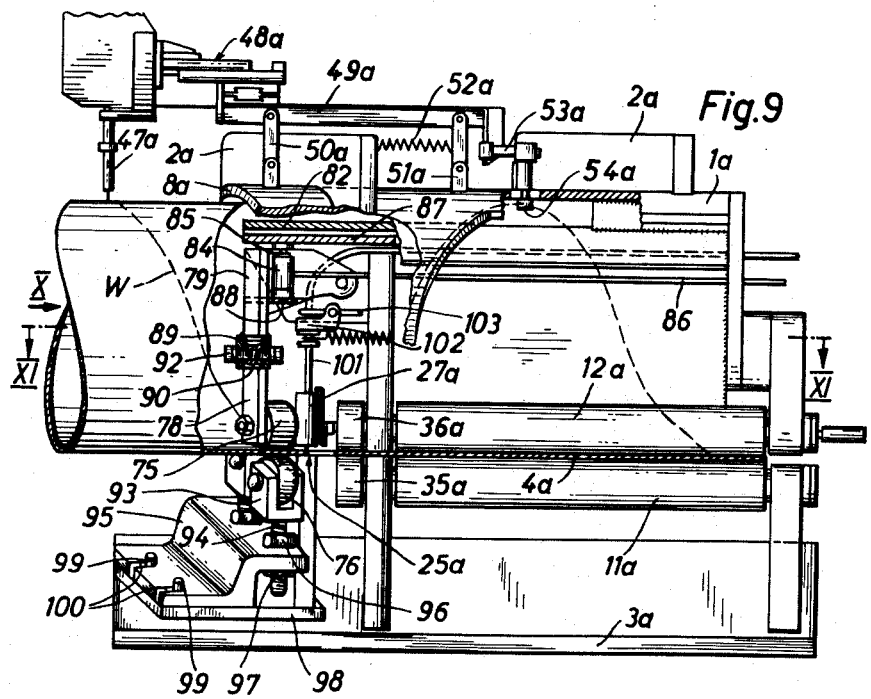
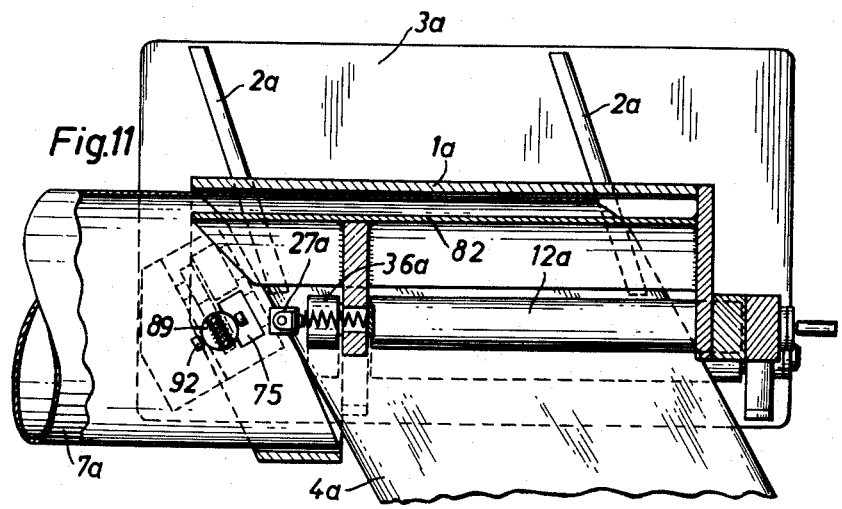
INVENTORS:
RICHARD DIENER,
BY WERNER WENNEMAN
Mestern & Kollin
ATTORNEYS 3,004,135
MACHINES FOR THE MANUFACTURE
OF TUBES
Richard Diener, Berlin-Hermsdorf, and Werner Wennemann, Dortmund, Germany, assignors to Hoesch Rohrwerke Aktiengesellschaft, Hagen, Westphalia, Germany, a body corporate of Germany
Filed Mar. 18, 1959, Ser. No. 800,306
Claims priority, application Germany Mar. 24, 1958
10 Claims. (Cl. 219—62)

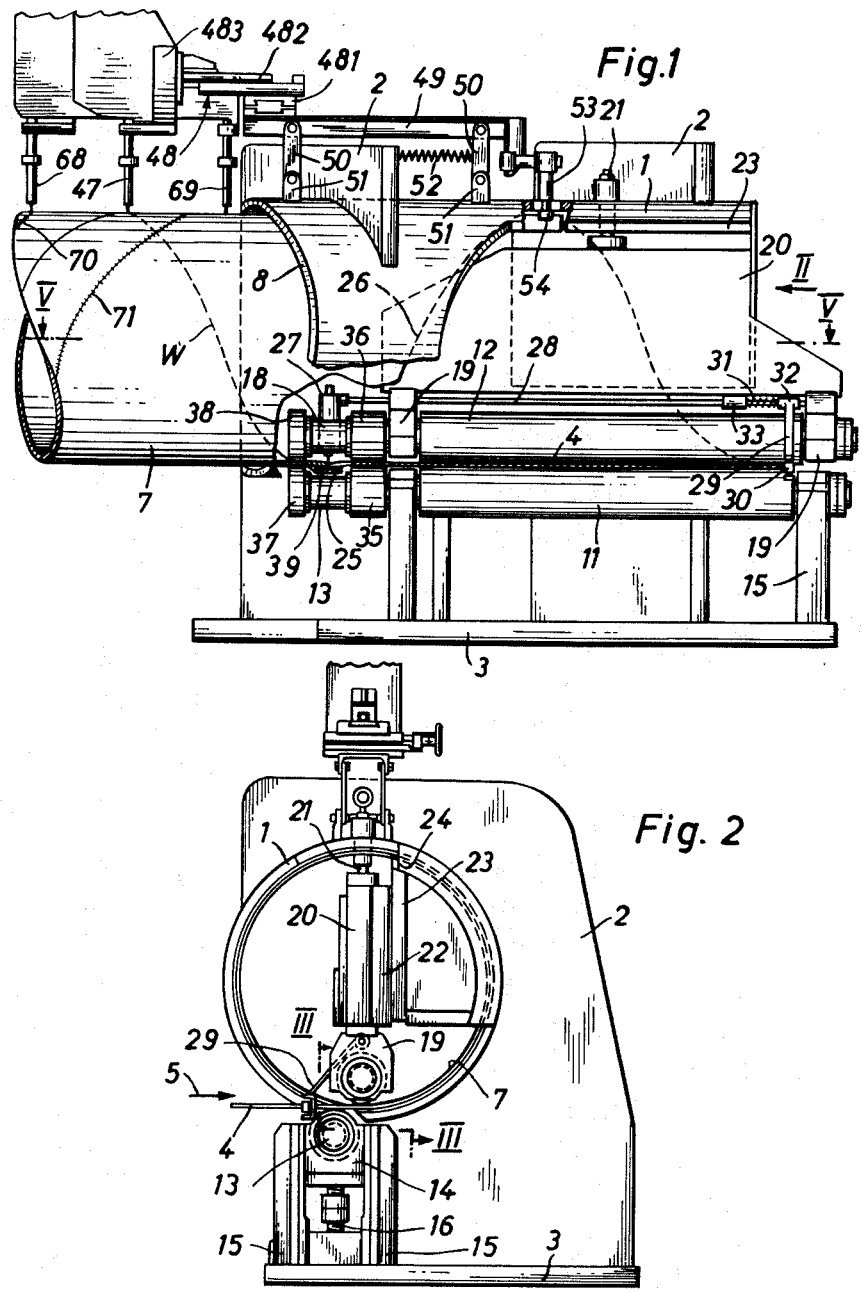

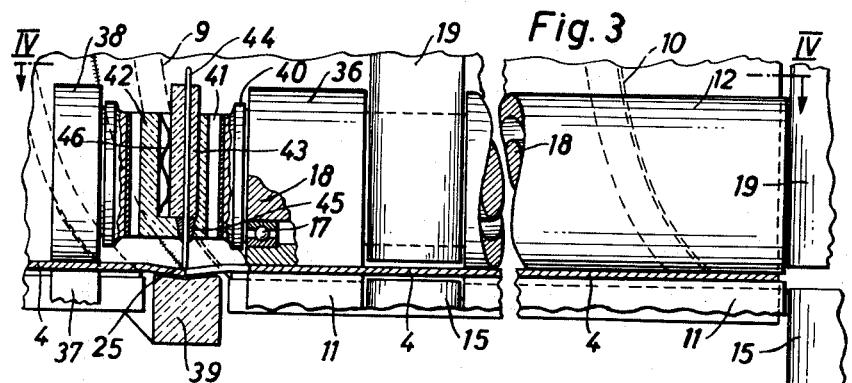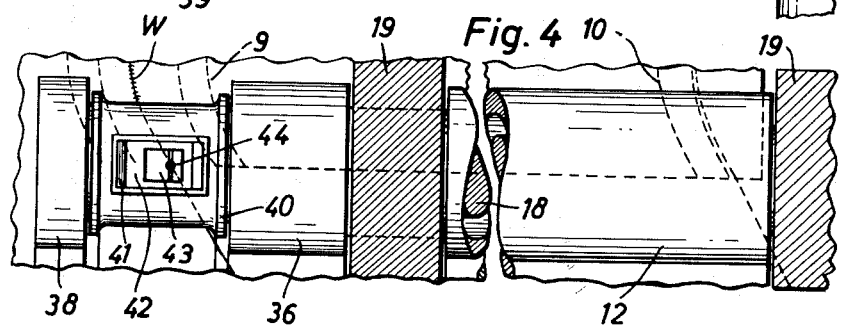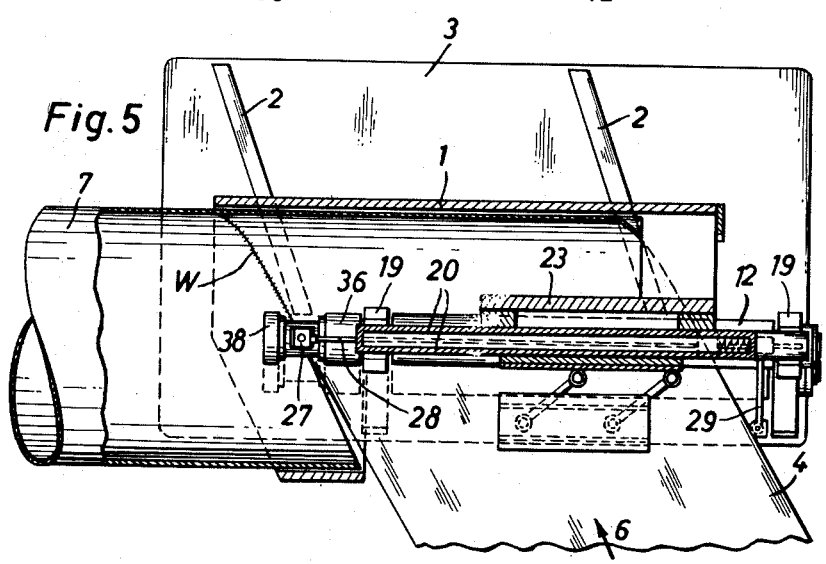

The invention relates to the manufacture of tubes from a helically wound steel strip or band by arc welding. It is known to produce welded tubes by winding a steel strip helically and welding together the adjacent edges of the wound strip. The tube may be wound inside a sleeve into which the strip is introduced obliquely and in tangential direction in such a way that it curves against the inner wall of the tube and is wound helically. If the angle at which the strip is introduced, the width of the strip, and the internal diameter of the sleeve are in the correct relationship to one another, then the edges of the helically wound strip emerging from the sleeve will abut against one another and can be welded together. The welding is then best carried out near the point where the edges first come into contact with one another, that is to say, at the outlet end of the sleeve.

The tube may be welded either from outside or from inside or from both sides. The tube is welded from both sides if one wishes to obtain a tube which will withstand large internal pressures. The welding heads are in that case displaced relative to one another by half a helical turn, measured along the welding seam. The welding may take place first from outside and then from inside or conversely.

It is important not to subject the seam to mechanical stress until it has cooled sufficiently not to tear or be permanently deformed under stress. If tears or permanent deformations occur in the welding seam, the tube will be leaky or crooked. To avoid this, there must be no movement of the welded parts relative to each other until the seam has cooled down to a certain extent. This is, however, particularly difficult when welding tubes with a helical seam, owing to the form of the seam and the constant movement of the strip and the tube.

It is an object of the present invention to avoid tears in the welding seam or permanent deformation when welding tubes with helical welding seams, starting from a steel band.

It is another object of the invention to fix the steel strip and the tube being formed during welding in such a way that no displacements which may cause tears in the welding seam or permanent deformation can occur.

It is a further object of the invention to construct the means by which the steel strip is supported and guided during welding in such a way that they can exert no forces on the steel strip which are directed transversely to the welding seam.

Finally, the invention also takes into account the fact that the width of the steel strip being treated is nearly always irregular owing to inaccuracies in the manufacture of the strip.

The following description and constructional examples illustrated in the accompanying drawing show in detail how the above mentioned aims are achieved. In the drawing:

FIGURE 1 is a side elevational view of a first embodiment of a welding machine according to the invention, partially in section;

FIGURE 2 is an end on view of the machine, viewed in the direction of the arrow II in FIGURE 1;

FIGURE 3 is a section on the line III—III in FIGURE 2 on a larger scale;

FIGURE 4 is a section on the line IV—IV in FIGURE 3;

FIGURE 5 is a section on the line V—V in FIGURE 1;

FIGURE 6 is a side view corresponding to FIGURE 1 of a modified embodiment;

FIGURE 7 is a section on the line VII—VII in FIGURE 6;

FIGURE 8 is a section corresponding to FIGURE 5 on a reduced scale with a modified control of the inner welding head;

FIGURE 9 is a side view corresponding to FIGURE 1 of a further embodiment, partially in section;

FIGURE 10 is an elevation in the direction of the arrow X in FIGURE 9; and

FIGURE 11 is a section on the line XI—XI in FIGURE 9.

In the machines illustrated, the tube is welded from inside and outside. The first welding is carried out from inside at the place already mentioned. The welding head for the second welding is displaced relative to the first welding head by half a helical turn along the welding seam. The invention can, however, also be carried out in welding machines having only one welding head which works either from inside or from outside; it can also be carried out in machines having two welding heads of which the first works from outside and the second from inside.

In the embodiment according to FIGURES 1 to 5, a sleeve 1 is connected to a base plate 3 through heavy, rigid vertical plates 2. This construction ensures that the winding sleeve will not be deformed by the forces to which it is subjected. The cylindrical wall of the sleeve 1 is partly cut away, mainly at those points where the steel strip 4, owing to its helical form, would in any case not come into contact with it.

The steel strip 4, from which the tube is to be made, enters the sleeve tangentially in the direction of the arrows 5 and 6 as shown in FIGURES 2 and 5. The strip is then bent against the inner surface of the sleeve and leaves as a tube 7 at the left-hand opening 8 of the sleeve. As can be seen from FIGURES 1 and 5, the strip 4 does not lie closely against the inner surface of the sleeve, because this inner surface has inwardly projecting ledges or rails running helically. Two of these ledges, 9 and 10, are shown in FIGURES 3 and 4. Ledges of this kind are known. Their purpose is to reduce the friction between the sleeve and the strip.

As shown in FIGURES 1 to 5, a system of guide rollers serves to guide and support the strip. This system consists of an outer roller 11 which bears against the strip on the outside, near its entry into the sleeve, and an inner roller 12 which contacts the strip from inside, at a small distance from the guide roller 11. The guide roller 11 is hollow and is mounted on a shaft 13 which does not participate in the rotation. This shaft is fixed in a slide 14 which can be adjusted in vertical guides 15 by means of spindles 16.

The mounting of the inner roller 12 is shown in more detail in FIGURES 3 and 4. The hollow body of the roller is rotatable on ball bearings 17 on a fixed shaft 18 which is fixed in brackets 19. The brackets 19 are mounted on the lower edge of a plate 20 which, as shown in FIGURE 5, has a hollow box profile for the purpose of making it more rigid. The plate 20 can be adjusted vertically by means of a spindle 21 and for this purpose it is displaceable in a guide 22 which is fixed to a rib 23. The rib is welded by means of a ledge 24 to the inside of the sleeve 1. By means of the spindles 16 and 21, the guide rollers 11 and 12 can be adjusted vertically as required to ensure accurate guidance of the strip 4.

A first welding of the edges of the strip is carried out at the point indicated by 25 in FIGURE 1, namely near the point where that edge of the strip which is on the right in FIGURE 1 has been bent to one complete turn 26 starting from its entry into the sleeve. The welding is effected by electric arcs, using a welding head 27 the details of which will be described more fully in connection with FIGURES 3 and 4. As shown in FIGURE 1, the welding head 27 is held by an axially displaceable rod 28 and can thus be displaced in the axial direction. This rod is guided in the brackets 19 and carries, at its right-hand end, an arm 29 with a roller 30 which bears on the right-hand edge of the strip 4. A tension spring 31, which is anchored to the hub 32 of the arm 29 and to a fixed member 33, keeps the roller 30 in contact with the edge of the strip.

It has been found that, in order to produce a good weld, it is necessary to give a particularly firm support and guidance to the strip in the immediate vicinity of the welding point. For this purpose, as shown in FIGURES 1 to 5, the shafts 13 and 18 on which the guide rollers 11 and 12 run are prolonged beyond the welding point 25. The extensions formed in this way carry additional rollers 35 and 36 to the right of the welding position 25 and further rollers 37 and 38 to the left of the welding position 25. In the region between the two pairs of rollers 35, 36 and 37, 38, the welding head 27 is disposed inside the strip and on the outside there is a copper plate 39 to conduct away the heat.

The section 40 of the shaft 18 between the rollers 36 and 38 may be constructed as a support for the welding head and, as shown in FIGURES 3 and 4, for this purpose has a gap 41 in which the housing 42 of the welding head is axially displaceable. The housing 42 receives a rectangular sleeve 43 through which the welding wire 44 is led. Into the bottom of the housing 42 is inserted a cone 45 of ceramic material, which enables the opening through which the wire 44 passes out to be disposed considerably nearer to the welding position 25 than would otherwise be possible. The housing 42 and the sleeve 43 are made of copper for the better removal of heat. An undulated spring 46 holds the sleeve 43 in the housing 42 without play.

The tube is also welded from outside by a welding head 47 arranged above the tube 7. The welding head 47 is offset from the welding head 27 by half a turn measured along the welding seam. It is mounted on a cross-slide, generally indicated by the reference numeral 48, which is fixed to a bridge 49 and allows the welding head to be adjusted along the three axes of a three-dimensional coordinate system. A part 481 is accordingly displaceable parallel to the bridge 49 and at right angles to the plane of the drawing, another part 482 is displaceable parallel to the part 481 in the plane of the drawing, and finally a third part 483, carrying the welding head 47, is displaceable at right angles to the part 482 in the plane of the drawing. The bridge 49 is swingably mounted on eyes 51 by means of links 50. The eyes 51 are fixed to the sleeve 1 on the outside. A tension spring 52 tends to swing the bridge 49 to the left. On a crank arm 53 the bridge 49 carries a roller 54, which, like the roller 30, bears against the right-hand edge of the strip 4. The spring 52 maintains the contact. Whereas the outer welding head 47 can be adjusted in three directions by a cross-slide, only an adjustment in the vertical direction by the spindle 21 is shown in the drawing for the inner welding head 27. However, the inner welding head may also be mounted so as to be displaceable in three directions.

The method of operating the machine does not require explanation except to say that the purpose of making the welding heads 27 and 47 axially displaceable is to adapt their position to the varying width of the strip.

In the modification shown in FIGURES 6 and 7, the guide rollers differ somewhat from those shown in FIGURES 1 to 5. To the right of the welding head 55, which corresponds to the welding head 27 in FIGURE 1, extend rollers 56 and 57, which each consist of a single piece. These rollers correspond to the roller parts 11, 35 and 12, 36, respectively in FIGURE 1. On the stationary shafts 58 and 59, to the left of the welding head 55, rollers 60 and 61 are rotatable. The rollers 60 and 61 correspond to the rollers 37 and 38 in FIGURE 1. The shafts 58 and 59 are extended beyond these rollers and supported at their ends. For this purpose, the shaft 58 is provided with supports 62 and the shaft 59 with brackets 63 which are fixed to a carrier 64 which corresponds to the part 20 in FIGURES 1 and 2.

The modification shown in FIGURE 8 differs from the embodiment of FIGURES 1 to 5 merely in the arrangement of the roller which determines the position of the inner welding head. An arm 65, which corresponds to the arm 29 in FIGURE 1, is attached directly to the welding head 66 and carries a roller 67 which bears against the left-hand edge of the strip 4. The construction otherwise corresponds to that in FIGURES 1 to 5 so that only the simplified diagram in FIGURE 8 is required.

FIGURE 1 shows further welding heads 68 and 69 to the right and left of the welding head 47. These welding heads 68 and 69 are only shown diagrammatically as they have nothing to do with the invention. They are not used for welding the edges of the strip together but rather to form weld beads 70 and 71 on the outside of the strip to reinforce the tube 7.

The embodiment shown in FIGURES 9 to 11 corresponds in many details with that shown in FIGURES 1 to 5. To avoid repetition, all corresponding parts which have already been explained in connection with FIGURES 1 to 5 are designated by the same reference numerals with the addition of the letter $a$. The following description is given to explain those parts which are different in construction from those in FIGURES 1 to 5.

In FIGURES 1 to 5, the supporting rollers 37 and 38 which are on the left of the welding position 25 are coaxial with the supporting rollers 11 and 12 which are on the right. These rollers exert axially directed frictional forces on the strip 4 passing through. In unfavorable circumstances, these frictional forces could impair the quality of the welding seam. The occurrence of these forces is avoided by the construction shown in FIGURES 9 to 11.

In FIGURES 9, 10 and 11, three rollers 75, 76 and 77 are arranged to the left of the welding position 25a. The roller 75 lies inside the tube and the rollers 76 and 77 are outside the tube. The inner roller 75 is mounted on a bar 78 which runs radially to the axis of the tube and which is adjustably fixed to an arm 79. This arm is rotatable on a pin which is mounted in a fork 81. The fork 81 is welded to a curved rib 82 which together with a projecting member 83 fulfils the same function as the parts 22 and 23 in FIGURE 2. A power generator consisting of a cylinder 84 and a piston 85, connected through a duct 86 to a source of hydraulic pressure which is not shown, acts between the cross-piece 87 of the fork 81 and a member 88 on the arm 79. The power generator 84, 85 tends to turn the arm 79 to the left in FIGURE 9, round the pin 80, thus pressing the roller 75 against the strip 4a.

The bar 78 is fixed to the arm 79 in such a way that it is adjustable along its longitudinal axis. For this purpose, a sleeve 89 is formed on the arm 79, and a pin 90 which forms the upper end of the bar 78 is inserted into this sleeve. The sleeve 89 has two elongated holes 91 through which screw bolts 92 can be screwed from opposite sides into a threaded transverse bore of the pin 90. When the bolts 92 are tightened, the bar 78 is fixed to the shaft 79.

The roller 76 is carried in a fork 93 which is mounted by a threaded pin 94 in a bracket 95 in such a way that it is adjustable in height and also angularly and can be fixed in the chosen position by nuts 96 and 97. Similar means are used for mounting the roller 77. The bracket 95 is displaceably fixed on a base plate 98 by means of tensioning studs 99 which project through oblique slots 100.

The supporting roller 75 and its counter-rollers 76 and 77 can be adjusted to the pitch of the helical winding by the described adjusting and fixing means. In geometrical terms, the generatrices of the surfaces of the three rollers at the point of contact with the strip 4a are at right angles at the tangent to the welding seam 48a.

The welding head 27a which is shown only diagrammatically in FIGURE 9 is mounted somewhat differently from that in FIGURE 1. It is carried by an arm 101 which is fixed to the underside of a sliding carriage 102. The carriage is guided in a slot 103 parallel to the axis of the tube 7a. The same means may be used as in FIGURE 1 or FIGURE 8 for controlling the welding head and have been omitted in FIGURES 9 to 11 for the sake of simplicity.

The bearings of the outer guide rollers 11a and 35a are constructed in the same way in FIGURES 9 to 11 as in FIGURES 1 to 5. There are some modifications as regards the bearings of the inner rollers 12a and 36a, but they are sufficiently clearly shown in the drawing and therefore do not need to be described.

We claim:

1. In an apparatus for the manufacture of helically welded tubing from a continuous strip of metal, in combination, a support; a sleeve secured to said support and provided with a substantially cylindrical internal forming surface; feed means for continuously introducing successive portions of said strip into engagement with said forming surface in a direction generally tangential to said surface and inclined to the axis of said surface, thereby winding said strip helically within said sleeve; welding means for welding together adjacent edges of said strip to form a helical seam; and clamping means adjacent said welding means for maintaining said adjacent edges in a predetermined relative position during welding, said clamping means including internal and external roller means bearing upon opposite surfaces of said strip at each of said edges.

2. In apparatus for the manufacture of helically welded tubing from a continuous strip of metal, in combination, a support; a sleeve secured to said support and provided with a substantially cylindrical internal forming surface; feed means including a pair of feed rollers engaging opposite surfaces of said strip for continuously introducing successive portions of said strip into engagement with said forming surface in a direction generally tangential to said surface and inclined to the axis of said surface, thereby winding said strip helically within said sleeve, each of said feed rollers being formed with an extremity engaging said strip along an edge thereof; welding means for welding together adjacent edges of said strip to form a helical seam; and clamping means including said extremities adjacent said welding means for maintaining said adjacent edges in a predetermined relative position during welding.

3. In apparatus for the manufacture of helically welded tubing from a continuous strip of metal, in combination, a support; a sleeve secured to said support and provided with a substantially cylindrical internal forming surface; feed means for continuously introducing successive portions of said strip into engagement with said forming surface in a direction generally tangential to said surface and inclined to the axis of said surface, thereby winding said strip helically within said sleeve; welding means for welding together adjacent edges of said strip to form a helical seam; and clamping means including internal and external roller means adjacent said welding means for maintaining a predetermined spacing between said adjacent edges during welding, each of said roller means comprising a pair of roller members bridging the gap between said adjacent edges.

4. In apparatus for the manufacture of helically welded tubing from a continuous strip of metal, in combination, a support; a sleeve secured to said support and provided with a substantially cylindrical internal forming surface; feed means for continuously introducing successive portions of said strip into engagement with said forming surface in a direction generally tangential to said surface and inclined to the axis of said surface, thereby winding said strip helically within said sleeve; welding means for welding together adjacent edges of said strip to form a helical seam; and clamping means adjacent said welding means for maintaining a predetermined spacing between said adjacent edges during welding, said clamping means including internal and external roller means bearing upon opposite surfaces of said strip at each of said edges, each of said roller means bridging the gap between said adjacent edges, said welding means being disposed between the roller members of at least one of said pairs.

5. In apparatus for the manufacture of helically welded tubing from a continuous strip of metal, in combination, a support; a sleeve secured to said support and provided with a substantially cylindrical internal forming surface; feed means for continuously introducing successive portions of said strip into engagement with said forming surface in a direction generally tangential to said surface and inclined to the axis of said surface, thereby winding said strip helically within said sleeve; first and second welding means spaced along the axis of said surface for welding together adjacent edges of said strip respectively internally and externally to form a helical seam, one of said welding means being disposed in proximity to said feed means; and clamping means adjacent said one of said welding means for maintaining said adjacent edges in a predetermined relative position during welding, said clamping means including internal and external roller means bearing upon opposite surfaces of said strip at each of said edges.

6. In apparatus for the manufacture of helically welded tubing from a continous strip of metal, in combination, a support; a sleeve secured to said support and provided with a substantially cylindrical internal forming surface; feed means for continously introducing successive portions of said strip into engagement with said forming surface in a direction generally tangential to said surface and inclined to the axis of said surface, thereby winding said strip helically within said sleeve; first and second welding means spaced along the axis of said surface for welding together adjacent edges of said strip respectively internally and externally to form a helical seam, said first welding means being disposed in proximity to said feed means; and clamping means adjacent said first welding means for maintaining said adjacent edges in a predetermined relative position during welding, said clamping means including internal and external roller means bearing upon opposite surfaces of said strip at each of said edges.

7. In apparatus for the manufacture of helically welded tubing from a continuous strip of metal, in combination, a support; a sleeve secured to said support and provided with a substantially cylindrical internal forming surface; feed means for continuously introducing successive portions of said strip into engagement with said forming surface in a direction generally tangential to said surface and inclined to the axis of said surface, thereby winding said strip helically within said sleeve; welding means for welding together adjacent edges of said strip to form a helical seam; and clamping means adjacent said welding means for maintaining said adjacent edges in a predetermined relative position during welding, said clamping means including a pair of roller members bearing upon opposite surfaces of said strip at one of said edges for maintaining said adjacent edges in a predetermined relative position, the axis of each of said roller members being substantially perpendicular to said seam at the points of contact of said members with said strip.

8. In apparatus for the manufacture of helically welded tubing from a continuous strip of metal, in combination, a support; a sleeve secured to said support and provided with a substantially cylindrical internal forming surface; feed means for continuously introducing successive portions of said strip into engagement with said forming surface in a direction generally tangential to said surface and inclined to the axis of said surface, thereby winding said strip helically within said sleeve; welding means for welding together adjacent edges of said strip to form a helical seam; and clamping means adjacent said welding means for maintaining said adjacent edges in a predetermined relative position during welding, said clamping means including a first pair of roller members bearing upon opposite surfaces of said strip at one of said edges, the axis of the roller members of said first pair being substantially perpendicular to said seam at the points of contact of said members with said strip, and a second pair of roller members bearing upon opposite surfaces of said strip at the other of said edges, the roller members of said second pair having axes substantially parallel to that of said surface.

9. In apparatus for the manufacture of helically welded tubing from a continuous strip of metal, in combination, a support; a sleeve secured to said support and provided with a substantially cylindrical internal forming surface; feed means for continuously introducing successive portions of said strip into engagement with said forming surface in a direction generally tangential to said surface and inclined to the axis of said surface, thereby winding said strip helically within said sleeve; and welding means for welding together adjacent edges of said strip, said welding means comprising a welding head shiftably mounted on said support, follower means operatively connected to said welding head and engaging an edge of said strip for displacing said head in a direction parallel to said axis in response to variations in the width of said strip; and clamping means adjacent said welding means for maintaining said adjacent edges in a predetermined relative position during welding, said clamping means including internal and external roller means bearing upon opposite surfaces of said strip at each of said edges.

10. In an apparatus for the manufacture of helically welded tubing from a continuous strip of metal, in combination, a support; a sleeve secured to said support and provided with a substantially cylindrical internal surface having strip-guiding formations spacedly projecting therefrom; feed means for continuously introducing successive portions of said strip into engagement with said formations in a direction generally tangential to said surface and inclined to the axis of said surface, thereby winding said strip helically within said sleeve while maintaining an annular clearance between the wound strip and said surface; welding means for welding together adjacent edges of said strip to form a helical seam; and clamping means adjacent said welding means for maintaining said adjacent edges in a predetermined relative position during welding, said clamping means including internal and external roller means bearing upon opposite surfaces of said strip at each of said edges, said external roller means extending from without into said clearance.

References Cited in the file of this patent

UNITED STATES PATENTS

| | | |
|---|---|---|
| 1,774,000 | Hand | Aug. 26, 1930 |
| 1,832,059 | Stresau | Nov. 17, 1931 |
| 2,837,626 | Buck et al. | June 3, 1958 |
| 2,862,469 | Jensen | Dec. 2, 1958 |